Nov. 13, 1934.        A. THOMA        1,980,946
SHOE BOTTOM FILLING APPARATUS
Filed Aug. 26, 1929        2 Sheets-Sheet 1
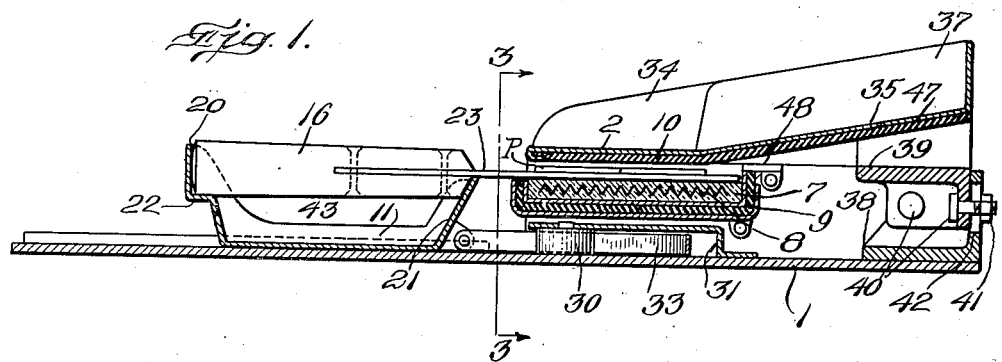
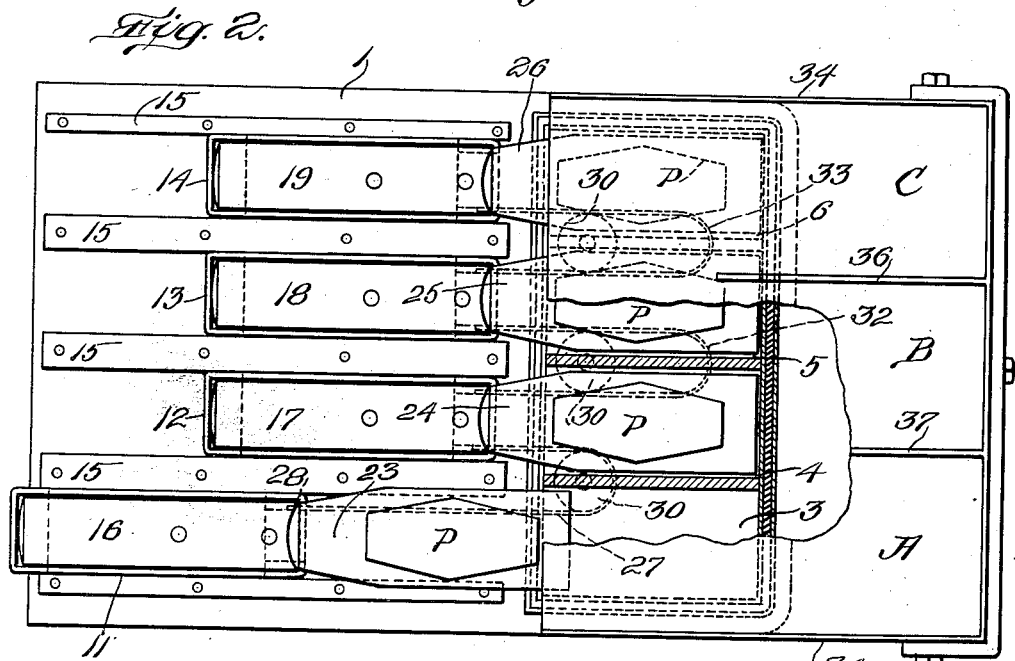
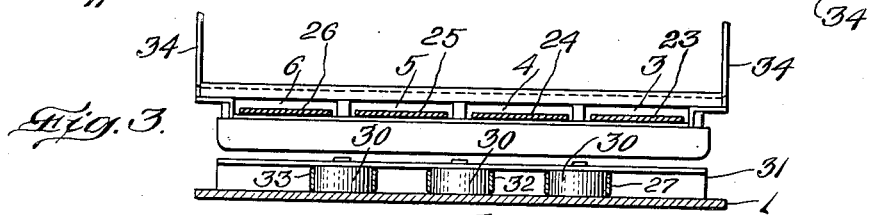
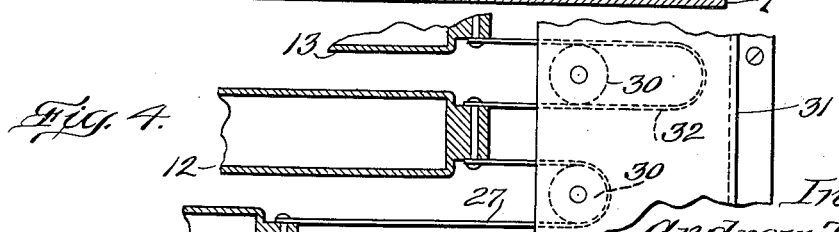

Nov. 13, 1934.  A. THOMA  1,980,946
SHOE BOTTOM FILLING APPARATUS
Filed Aug. 26, 1929  2 Sheets-Sheet 2

Inventor:
Andrew Thoma,
by Roberts, Cashman & Woodberry,
attys

Patented Nov. 13, 1934

1,980,946

UNITED STATES PATENT OFFICE 1,980,946

SHOE BOTTOM FILLING APPARATUS

Andrew Thoma, Cambridge, Mass., assignor to North American Chemical Company, Cambridge, Mass., a corporation of Massachusetts Application August 26, 1929, Serial No. 388,321

3 Claims. (Cl. 18—1)

My invention is a machine for facilitating the filling of shoe-bottom cavities with shoe filler in the form of plastic died-out pieces and is especially adapted to accomplishing the same with extra high heat and at much greater speed, neatness and economy than has heretofore been possible. This apparatus is for carrying out the method set forth in my concurrent method application Serial No. 388,320, filed August 26, 1929. The kind of filler piece is set forth in my application Ser. No. 297,630 filed Aug. 6, 1928. My machine contemplates the application to the successive shoe-bottom cavities of the plastic filler pieces when properly conditioned by the machine by means of hand tools or spatulas such as have been heretofore commonly employed in shoe factories in connection with my bulk or loaf filler. The procedure heretofore customary has been for the operator to take his spatula in his hand and dip from the conditioning basin or pot such portion of the melted filler as required for the invidided shoe, then apply the same to the shoe-bottom giving it a preliminary smoothing or laying and spreading application with the knife as the filler is dumped in the shoe-bottom, and then finishing the spreading by means of a hot roll, all as set forth for example in Patent No. 1,523,701 of January 20, 1925. According to my present invention however a plurality of spatulas or filler knives are employed, sufficient in number to have one and its filler piece always ready in accordance with the degree of heat and speed of the operator. Supporting means or carriers are provided for these several spatulas or knives and a confined heating chamber for each knife, together with high heating means for instantly applying to the knife and the piece a strong intense heat. Preferably above the heating chamber is a supply pan for the pieces which are to be placed upon the respective spatulas by the operator as the knives are returned empty one after the other to the apparatus after each has delivered to the shoe-bottom cavity the fully conditioned filler piece with which it was previously loaded.

Further details and the method of use will be set forth in connection with the accompanying drawings in which:

Fig. 1 is a vertical transverse section through a portion of the machine taken longitudinally through one of the spatula carriers and the adjacent parts of the machine;

Fig. 2 is a top plan view of the machine, parts being broken away for clearness of illustration;

Fig. 3 is a cross sectional detail on the dotted line 3—3 Fig. 1;

Fig. 4 is a horizontal sectional detail of certain portions of the carrier connecting mechanism;

Figure 5:
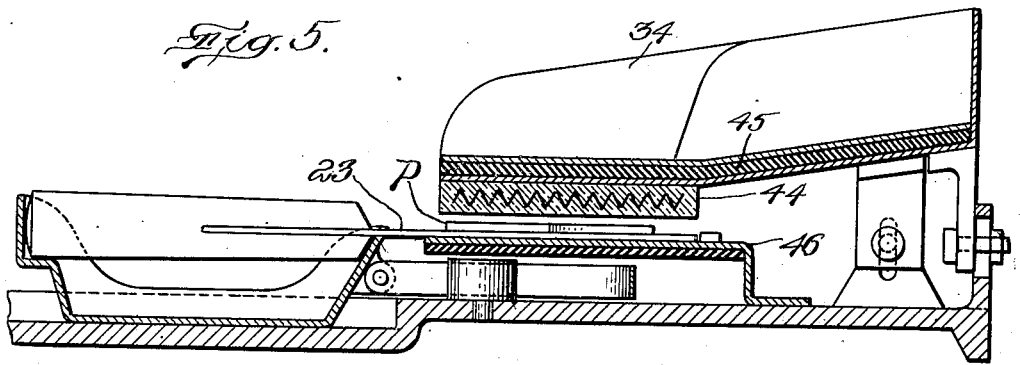
Fig. 5 is a view similar to Fig. 1 of a modified construction.

On a suitable platform 1 I mount a cover 2 on the underside of which is the heating chamber herein shown as comprising four compartments 3, 4, 5 and 6, on the underside of which chamber is suitable heating means which may be of any kind available or preferred such as steam, gas, or electricity, but herein shown for convenience of illustration as a hot plate 7 electrically heated by the usual means 8. The underside of this plate is indicated as heavily insulated at 9 and the cover 2 also has heavy insulation 10. In front of these several compartments are spatula carriers 11, 12, 13, 14 arranged to slide toward and from the heating compartment between guides 15. A filling tool, knife, or spatula is supported by each carrier, four thereof 16, 17, 18 and 19 being herein shown, the handle of a spatula being shown in Fig. 1 as resting at its opposite ends between positioning stops 20, 21 formed at the back and front of the carrier 11 and resting at the rear end on a ledge 22 while the blade 23 of the spatula rests on the upper edge of the stop 21. The carrier 11 and its spatula are shown in Fig. 2 with the blade 23 withdrawn from the heater compartment 3 while the remaining spatulas 17, 18, 19, have their respective blades 24, 25, 26 within their heating compartments 4, 5, and 6. Preferably the carriers are connected for cooperative automatic movement, a flexible band preferably of spring metal being shown as a convenient means. This band as shown in Figs. 1-4 is in sections, a section 27 being secured at 28 to the carrier 11 and at 29 at its opposite end to the carrier 12 and passing around a pulley 30 mounted in a housing 31. Other bands similarly secured and mounted are shown at 32 and 33. The cover 2 also preferably constitutes the bottom of a filler supply pan 34, said bottom being inclined at least part of its length as indicated at 35 for facilitating the movement of the supply of filler pieces. Also this pan or supply member is preferably divided by partitions 36, 37, into at least three compartments A, B, C, for different sizes of pieces. Preferably also the heating chamber is variable in size to accommodate different thicknesses of filler pieces in accordance with the kind of shoe factory and the work being done. This can be accomplished in various ways but for convenience of illustration I have shown the pan whose bottom constitutes the top of the heat chamber as mounted on an adjustable support whose base 38 and upper part 39 are adjustably clamped to each other by thumb screws 40, 41, cooperating with vertical slots 42. While my invention is capable of handling any kind of filler piece which needs softening by heat, the main purpose thereof is to provide means for facilitating the use of the high-heat responsive filler pieces of my copending application first above mentioned, in which a sudden high heat is required for melting or properly softening the powdered asphalt or other elements requiring extremely high heat. As fully explained in my method application already referred to, the present apparatus and the method which it facilitates cooperate in making it possible and practicable to handle in a shoe filler such desirable ingredients as hard asphalt without the risk of destroying the body material as would be the case with a long continued heat even lower in temperature than this apparatus makes feasible. Each of the blades having been loaded with one filler piece, P, as shown in Fig. 2, the operator pulls out the first carrier, grasping the handle of the spatula 16, (its carrier 11 having a space or hand-hold 43 as shown in Fig. 1 between the handle and the carrier to permit the fingers of the hand to grasp the handle quickly), and lifts the spatula with its softened filler piece P and flops it over bottomside up in the cavity of the shoe-bottom which he holds in his left hand. Simultaneously he gives the piece a quick spreading back and forth movement with the blade 23 thereby sticking the piece to the bottom of the cavity and likewise spreading it to the confines thereof. Having filled this first shoe by said simple quick movement, he places the spatula back as shown in Fig. 2, pokes a fresh filler piece from the pan 34 onto the blade 23 and then pulls out the carrier 12 with its filler piece now properly softened. This outward movement of said carrier instantly slides into heating position the first spatula. As this is happening, the operator lifts the spatula 17 and fills the second shoe by flopping the second piece the same as before, thereby depositing the second filler piece in the cavity of the second shoe and spreading it in place by a quick back and forth movement of the hot blade. He then places this second knife or spatula 17 back as it was, pokes a fresh piece down from the pan onto its blade and pulls out the third spatula 18. This movement automatically carries the second spatula 17, which has just been used and refilled, forward into heating position, whereupon the operator lifts the said third spatula 18 with its softened filler piece, flops it over so as to deposit its piece into the cavity of the third shoe. The same instant deft movement of the hot blade spreads the third piece in the third shoe. The operator then restores the third knife 18, places a fresh piece thereon and pulls out the fourth carrier 14 with its spatula 19 and properly softened filler piece. The latter he applies to the fourth shoe-bottom cavity the same as before and restores the spatula to its carrier 14, loads it with a fresh piece and shoves the carrier into heating position. He then pulls out the first carrier 11 with its spatula 16 and now properly softened second load or filler piece and proceeds as before.

The mechanism of Fig. 5 is the same in construction and operation excepting that the hot plate is above the filler piece. A hot plate 44 is secured to the underside of the pan and insulation 45 is provided under the latter considerably heavier than when the hot plate was at a distance as in the preceding construction. A guide leaf 46 is provided to direct the blade 23 when entered beneath the hot plate with its piece P. The operation is the same as already explained excepting that in this case the blade is permitted to remain much cooler than in the previous construction in which it rests directly on the hot plate. This construction of Fig. 5 is preferable for certain types of filler pieces which are more homogeneous throughout or which do not have such high heat constituents or which do not have a high heat constituent on one side. With the latter types the construction which requires the blade of the spatula to come in direct contact with the hot plate is preferable. Referring again to the construction of Figs. 1-4, it will be observed that I have inclined the bottom of the pan as shown at 47 and have provided a vent 48 tending to withdraw the stream of heat rearward instead of forward, the purpose being to prevent the heat flowing into the face of the operator. The heat is confined and safeguarded by the enclosure or chamber so as to make the softening of the filler piece rapid. The plate 7 on which the spatula knives rest is kept at a glowing heat to shorten the presence of the spreading knife or spatula within this heating chamber. I aim also to confine the heated member to as small an area or portion of the apparatus as possible. The number of spatulas required and hence the extent of the apparatus used will depend upon the speed of the operator, the degree of heat employed and the kind of filler piece being used. The operator is not obliged to lift a filler piece in the pan but simply slides it or causes it to glide down the incline and out onto the knife blade. For this reason the distance that the piece has to fall from the bottom of the pan onto the blade is made as little as possible. The general construction enables the operator to observe the condition of the partially softened filler piece in the pan or of the filler piece on the withdrawn spatula and if the latter has not yet been brought into proper condition he can readily slide it back into the heater without having disturbed it in any way. This is of importance as the piece in this condition if disturbed would tend to stick fast to anything pressed against it, or against which it might be pressed.

Figure 6:
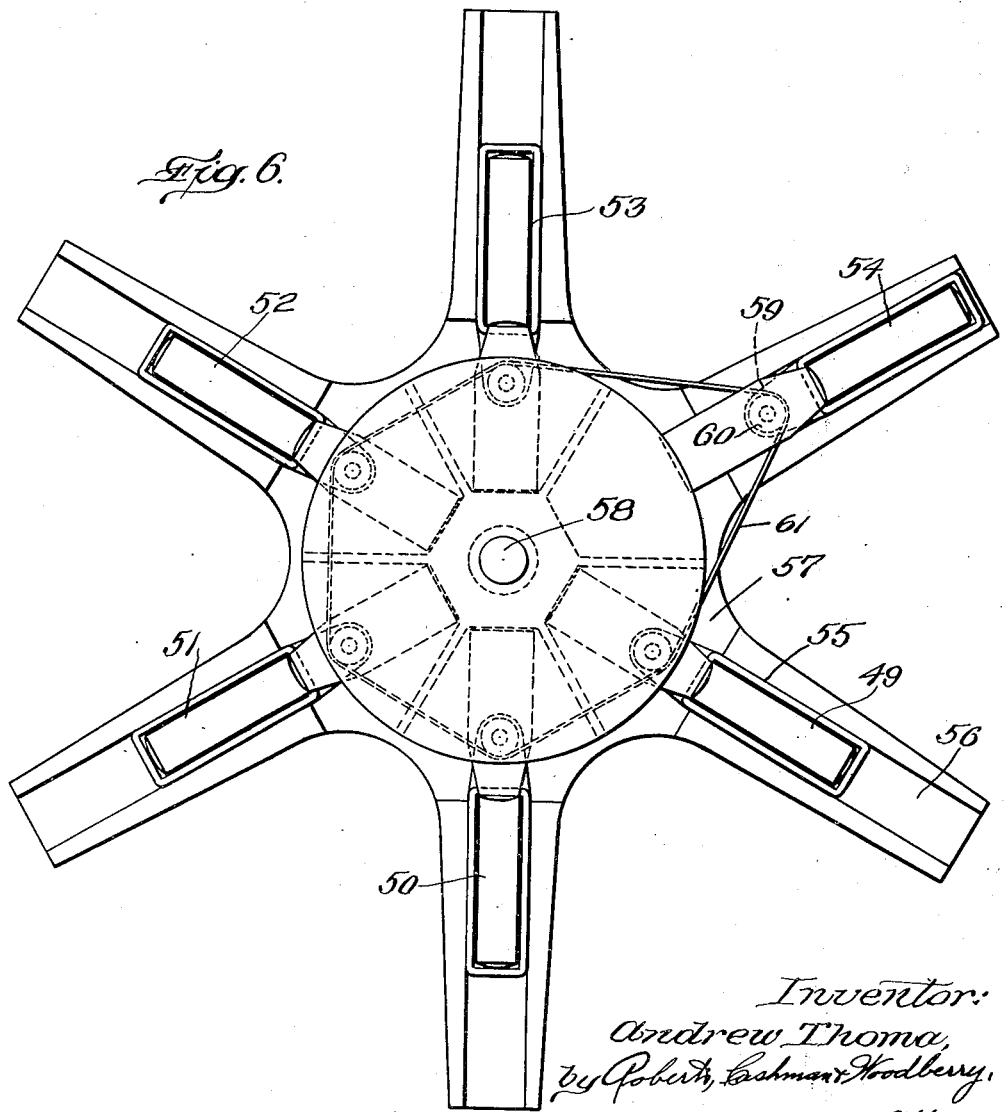
Fig. 6 is a top plan view of a further modification.

In Fig. 6 I have briefly shown an apparatus which is more automatic and adapted to the very high speed operators. This shows six spatulas 49, 50, 51, 52, 53, 54, in carriers 55 arranging to slide in ways 56 of a wheel or spider 57 turning on a pivot or center 58, these carriers have a rigid ear or arm 59 projecting at their inner ends on which is mounted a pulley 60 corresponding to the pulley 30 in Fig. 2 and engaging the pulleys of all six carriers is a band 61 which corresponds to the band 27 of Fig. 2. Thus whenever a carrier and its spatula are pulled out all the rest are held in. For example when in the various positions shown in Fig. 6 if the carrier 55 should be pulled out, the carrier 54 would automatically move inward. This relation and operation would take place entirely around the circle. The heater, pan and general operation and arrangement are the same in the construction of the species of Fig. 6 as in the previously described constructions so that I have omitted further details of illustration, description, and explanation of operation.

What I claim is:—

1. Shoe-bottom filling apparatus, comprising a heating chamber, heating means therefor, a plurality of carriers each adapted to carry a filler piece into said chamber for heat treatment and to withdraw the same when heated, and means for causing said carriers to operate in rotation and automatically to hold certain of the pieces in heating position when a heated piece is withdrawn.

2. In a shoe-bottom filling apparatus, heating means for heating a plurality of filler pieces, separate carriers for the individual filler pieces, and means for automatically moving one carrier and its piece inward to position for heating the piece when another carrier and its piece are withdrawn.

3. In a shoe-bottom filling apparatus, heating means for heating a plurality of filler pieces including a series of contiguous chambers arranged for one filler piece each, a carrier and guiding means therefor in front of each chamber adapted to deliver a filler piece to be heated, and connections for said carriers adapted to control automatically the movements of one carrier with relation to others so as to maintain a given number always in heating position.

ANDREW THOMA.